(12) United States Patent
Moon et al.

(10) Patent No.: US 8,271,137 B2
(45) Date of Patent: Sep. 18, 2012

(54) ROBOT AND METHOD OF CONTROLLING THE SAME

(75) Inventors: Kyung Won Moon, Seoul (KR); Kyung Shik Roh, Seognam-si (KR); Hyun Kyu Kim, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 409 days.

(21) Appl. No.: 12/585,188

(22) Filed: Sep. 8, 2009

(65) Prior Publication Data

US 2010/0138038 A1   Jun. 3, 2010

(30) Foreign Application Priority Data

Nov. 28, 2008 (KR) .................. 10-2008-0119707

(51) Int. Cl.
*B25J 19/06* (2006.01)
*G05B 15/00* (2006.01)
*G06F 19/00* (2006.01)

(52) U.S. Cl. ............... 700/258; 700/279; 318/568.16; 901/28; 901/46

(58) Field of Classification Search .......... 700/245, 700/258, 275, 279; 318/568.12, 568.11, 318/568.162; 74/490.05; 180/8.1, 8.2, 8.3; 901/1, 28, 46
See application file for complete search history.

(56) References Cited

U.S. PATENT DOCUMENTS

| | | | | |
|---|---|---|---|---|
| 4,808,063 A | * | 2/1989 | Haley | 414/730 |
| 5,311,109 A | * | 5/1994 | Ozawa | 318/568.11 |
| 5,404,086 A | * | 4/1995 | Takenaka et al. | 318/568.12 |
| 5,808,433 A | * | 9/1998 | Tagami et al. | 318/568.12 |
| 7,099,747 B2 | * | 8/2006 | Mikami et al. | 700/245 |
| 7,946,364 B2 | * | 5/2011 | Suga et al. | 180/8.1 |
| 2005/0125099 A1 | * | 6/2005 | Mikami et al. | 700/245 |
| 2009/0171505 A1 | * | 7/2009 | Okazaki | 700/258 |

FOREIGN PATENT DOCUMENTS

KR    10-2006-0026038    3/2006

* cited by examiner

*Primary Examiner* — Ronnie Mancho
(74) *Attorney, Agent, or Firm* — Staas & Halsey LLP

(57) ABSTRACT

There is provided a robot, which compensates for the angle of a joint, bent due to external force, using a redundant degree of freedom of the robot, and a method of controlling the same. The method includes sensing a bending angle of a joint due to external force or a torque applied to the joint, comparing the bending angle of the joint or the torque applied to the joint with an allowable safety reference value; and adjusting the bending angle of a higher-level joint of the joint using a redundant degree of freedom of the robot, when the bending angle or the torque reaches the allowable safety reference value, thereby compensating for the excessively bending angle of the joint and thus being capable of safely controlling the robot.

18 Claims, 10 Drawing Sheets

ROBOT AND METHOD OF CONTROLLING THE SAME

CROSS-REFERENCE TO RELATED APPLICATIONS

This application claims the priority benefit of Korean Patent Application No. 2008-0119707, filed on Nov. 28, 2008, in the Korean Intellectual Property Office, the disclosure of which is incorporated herein by reference.

BACKGROUND

1. Field

Embodiments relate to a robot and a method of controlling the same, and more particularly to a robot, which compensates for the angle of a bent joint using a redundant degree of freedom of the robot, and a method of controlling the same.

2. Description of the Related Art

In general, machines, which conduct motions similar to those of a human being using an electrical or mechanical action, refer to robots. The origin of the word "robot" is derived from the Slavic "ROBOTA". Most initial robots, which were conventionally spread, were industrial robots, such as manipulators or transfer robots for automation and unmanned operation of production in a plant.

Recently, walking robots, which imitate the body mechanism and motion of an animal walking erect with two feet, such as a human being or a monkey, have been researched and developed, and the expectation of the practical use of the walking robots has increased. The biped walking has disadvantages, such as instability and difficulty in pose control or walking control, compared with the crawler-type, quadruped or hexapod walking, but is excellent in achieving a flexible motion, i.e., more flexibly coping with an uneven walking surface, such as an uneven surface of the ground or a surface having unevenness on a working route, or a discontinuous walking surface, such as a stairway or a ladder.

Particularly, a robot, which models on the biological mechanism and action of a human being, is referred to as a "humanoid robot". The humanoid robot performs living supports, for example supports to human activities in residential conditions and other various living conditions.

The meaning of the research and development of the humanoid robot is grasped from two viewpoints, as follows.

First, from the viewpoint of human science, through a process of simulating a human walking motion using a robot having a similar structure to human legs and/or arms and a method of controlling the same, the mechanism of natural motions of a human being including a walking motion can be technically explained. The result of this research contributes greatly to the progress in various fields dealing with the human mechanism, such as ergonomics, rehabilitation, and sports science.

Second, the development of robots serving as a human partner, i.e., robots supporting human activities in residential conditions and other various living conditions, is required. Robots of this kind need to be functionally grown by learning a method of adaptation to persons having different individualities or different conditions from a human being in various situations of a human living environment. Here, a robot having the same shape or structure as that of a human being fulfils its effective function in respect of a smooth conversation between the robot and the human being.

SUMMARY

In an aspect of exemplary embodiments, there is provided a robot, in which when a joint of the robot is bent to a critical angle due to external force, the angle of a joint of a higher-level link is adjusted using a redundant degree of freedom of the robot, and a method of controlling the robot.

In accordance with an aspect of exemplary embodiments, there is provided a method of controlling a robot, including sensing a bending angle of a joint due to external force; comparing the bending angle of the joint with an allowable safety angle; and securing a redundant degree of freedom of a higher-level joint of the joint to rotate the higher-level joint in the direction of reducing the bending angle of the joint, when the bending angle of the joint is more than the allowable safety angle.

The redundant degree of freedom may be secured by reducing impedance stiffness gains of the higher-level joint.

The redundant degree of freedom may be secured by reducing at least one gain out of gains of the higher-level joint regarding rotations on roll, pitch, and yaw axes.

The redundant degree of freedom may be secured by setting at least one gain out of gains of the higher-level joint regarding rotations on roll, pitch, and yaw axes to zero.

The allowable safety angle may be an angle, at which the joint cannot move any more, or a predetermined angle.

In accordance with another aspect of exemplary embodiments, there is provided a method of controlling a robot, including sensing a torque applied to a joint; comparing the torque with an allowable safety torque; and securing a redundant degree of freedom of a higher-level joint of the joint to rotate the higher-level joint in the direction of reducing the torque applied to the joint, when the torque is more than the allowable safety torque.

The redundant degree of freedom may be secured by reducing impedance stiffness gains of the higher-level joint.

The redundant degree of freedom may be secured by reducing at least one gain out of gains of the higher-level joint regarding rotations on roll, pitch, and yaw axes.

The redundant degree of freedom may be secured by setting at least one gain out of gains of the higher-level joint regarding rotations on roll, pitch, and yaw axes to zero.

The allowable safety torque may be a torque, at which the joint cannot be normally operated, or a predetermined torque.

In accordance with a further of exemplary embodiments, there is provided a robot including an angle sensing unit to sense a bending angle of a joint of the robot due to external force; and a control unit to confirm whether or not the bending angle of the joint reaches an allowable safety angle, and secure a redundant degree of freedom of a higher-level joint of the joint to rotate the higher-level joint in the direction of reducing the bending angle of the joint, when the bending angle of the joint reaches the allowable safety angle.

The control unit may secure the redundant degree of freedom by reducing impedance stiffness gains of the higher-level joint.

The control unit may secure the redundant degree of freedom by reducing at least one gain out of gains of the higher-level joint regarding rotations on roll, pitch, and yaw axes.

The control unit may secure the redundant degree of freedom by setting at least one gain out of gains of the higher-level joint regarding rotations on roll, pitch, and yaw axes to zero.

In accordance with a still further aspect of exemplary embodiments, there is provided a robot including a torque sensing unit to sense a torque applied to a joint of the robot; and a control unit to confirm whether or not the torque applied to the joint reaches an allowable safety torque, and secure a redundant degree of freedom of a higher-level joint of the joint to rotate the higher-level joint in the direction of reducing the torque applied to the joint, when the torque applied to the joint reaches the allowable safety torque.

The control unit may secure the redundant degree of freedom by reducing impedance stiffness gains of the higher-level joint.

The control unit may secure the redundant degree of freedom by reducing at least one gain out of gains of the higher-level joint regarding rotations on roll, pitch, and yaw axes.

The control unit may secure the redundant degree of freedom by setting at least one gain out of gains of the higher-level joint regarding rotations on roll, pitch, and yaw axes to zero.

BRIEF DESCRIPTION OF THE DRAWINGS

These and/or other aspects of exemplary embodiments will become apparent and more readily appreciated from the following description of exemplary embodiments, taken in conjunction with the accompanying drawings in which.

DETAILED DESCRIPTION

Figure 1:
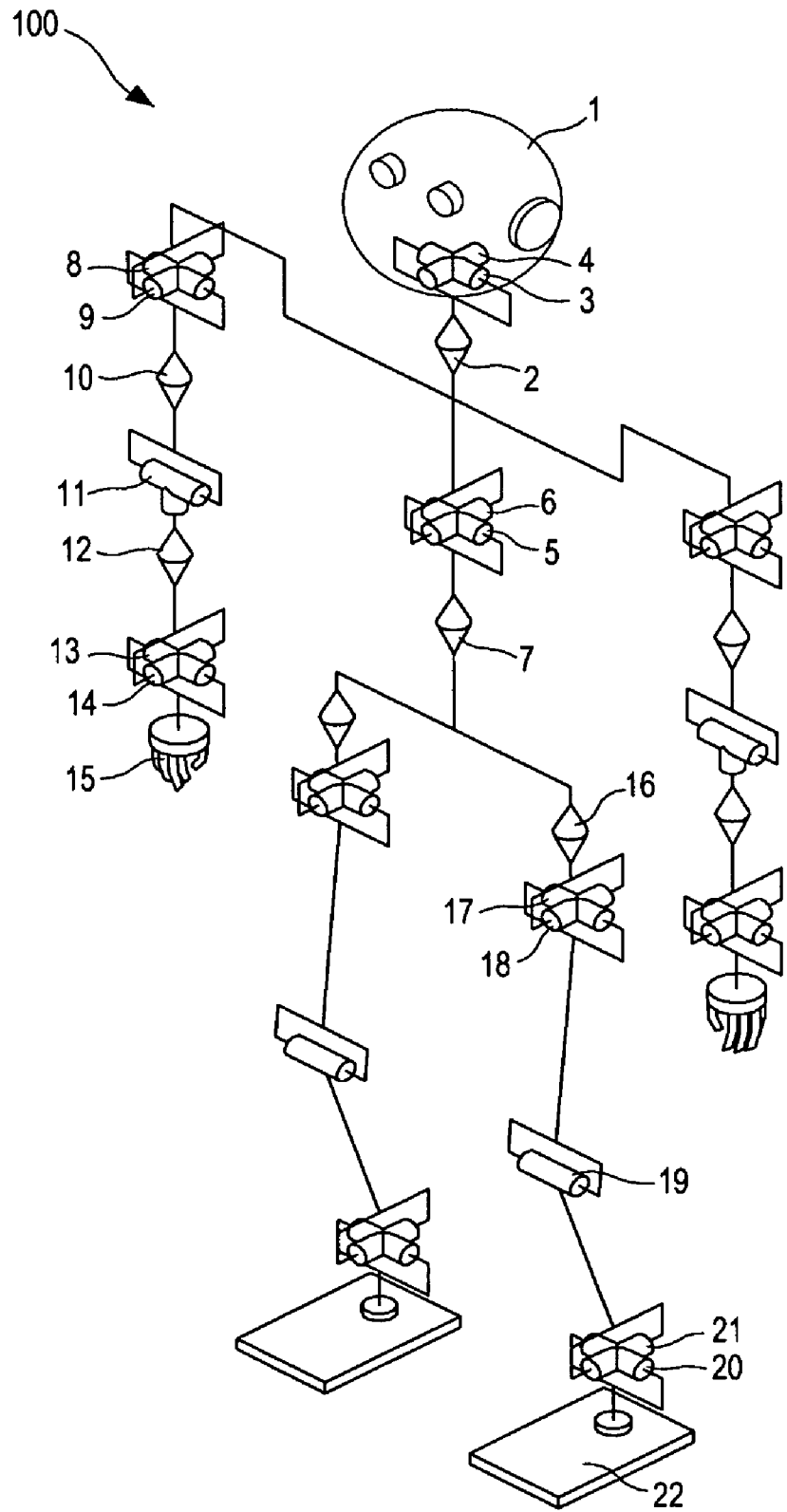
FIG. 1 is a schematic view illustrating degrees of freedom of joints of a humanoid robot in accordance with an exemplary embodiment.

Reference will now be made in detail to exemplary embodiments, an example of which is illustrated in the accompanying drawings, wherein like reference numerals refer to like elements throughout. Exemplary embodiments will be described below to explain the disclosure by referring to the drawings.

FIG. 1 is a schematic view illustrating degrees of freedom of joints of a humanoid robot in accordance with an exemplary embodiment.

As shown in FIG. 1, a humanoid robot 100 includes two arms, a head 1, two legs achieving a motion, and a torso connecting the arms and the legs.

A neck joint of the head 1 includes a neck joint yaw axis 2, and a neck joint pitch axis 3, and a neck joint roll axis 4, and thus has 3 degrees of freedom.

Each of the arms includes a shoulder joint pitch axis 8, a shoulder joint roll axis 9, an upper arm yaw axis 10, an elbow joint pitch axis 11, a lower arm yaw axis 12, a wrist joint pitch axis 13, a wrist joint roll axis 14, and a hand 15. The hand 15 is a structure having multi joints and multi degrees of freedom, which includes a plurality of fingers. However, since the motion of the hand 15 scarcely contributes to or affects the control of pose stability and the control of a walking motion, it is supposed that the hand 15 has a zero degree of freedom, in an exemplary embodiment. Thus, each of the arms in an exemplary embodiment has 7 degrees of freedom.

The torso includes a torso pitch axis 5, a torso roll axis 6, and a torso yaw axis 7, and thus has 3 degrees of freedom.

Each of the legs includes a leg joint yaw axis 16, a leg joint pitch axis 17, a leg joint roll axis 18, a knee joint pitch axis 19, an ankle joint pitch axis 20, an ankle joint roll axis 21, and a foot (the sole of the foot) 22. It is supposed that an intersection point between the leg joint pitch axis 17 and leg joint roll axis 18 is to define the position of a leg joint of the robot 100 in accordance with an exemplary embodiment.

The respective degrees of freedom of the above-described humanoid robot 100 are substantially obtained using actuators. The actuators exemplarily have a small size and a light weight based on requirements, such as similarity to the natural shape of a human being through the exclusion of extra expansion in external appearance and pose control to an instable structure.

Figure 2:
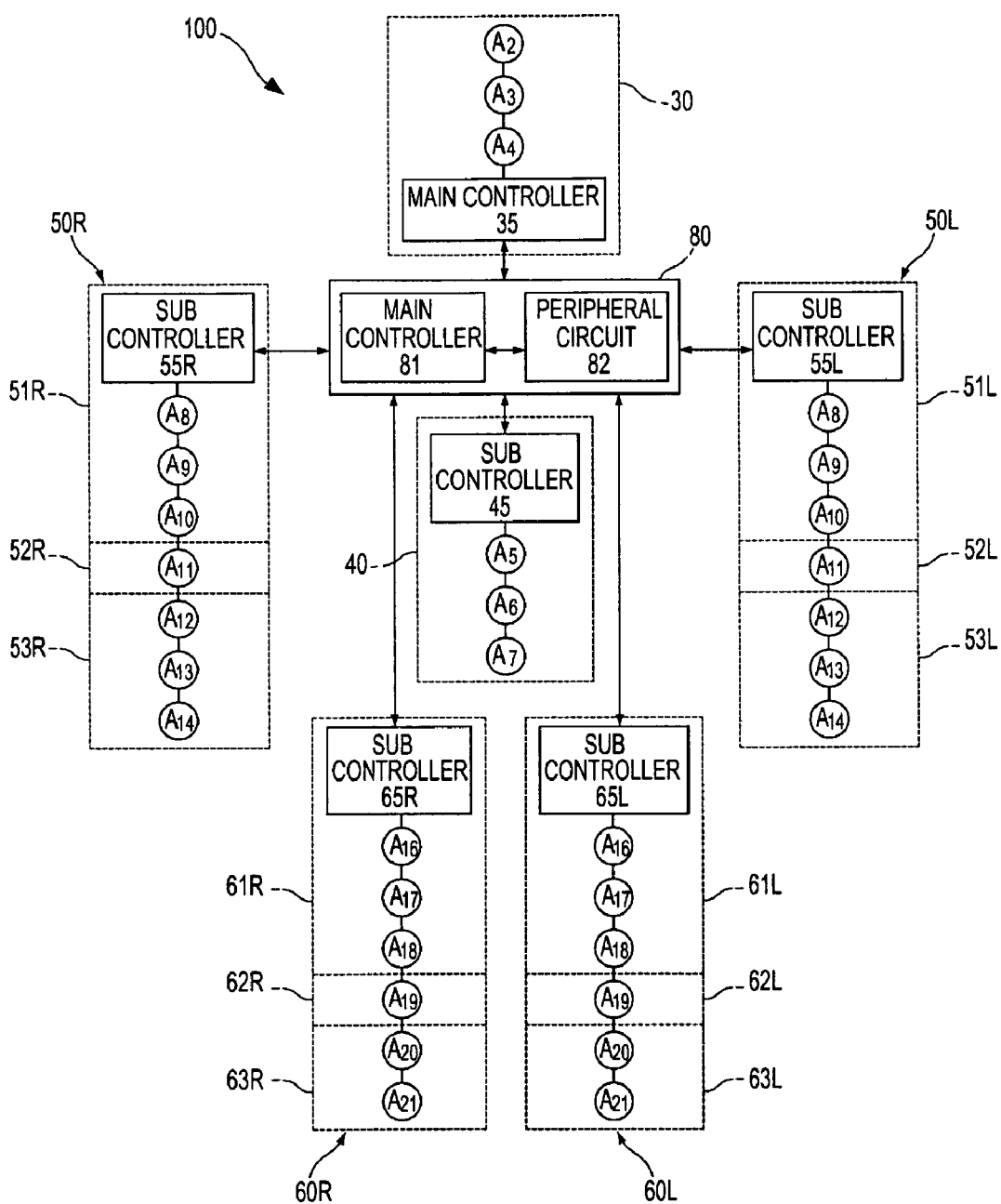
FIG. 2 is a schematic view illustrating a control system of the robot in accordance with an exemplary embodiment.

FIG. 2 is a schematic view illustrating a control system of the robot in accordance with an exemplary embodiment.

As shown in FIG. 2, the humanoid robot 100 includes respective mechanism units 30, 40, 50R/L, and 60R/L representing parts of a human body, and a control unit 80 performing control to achieve cooperation among the respective mechanism units 30, 40, 50R/L, and 60R/L. Here, R represents the right side of the robot 100, and L represents the left side of the robot 100.

The overall operation of the humanoid robot is generally controlled by the control unit 80. The control unit 80 includes a main controller 81 including a main circuit part (not shown), such as a central processing unit (CPU) chip or a memory chip, and a peripheral circuit 82 including an interface for exchanging data or commands with the respective parts of the robot 100.

The degrees of freedom of the respective joints in the humanoid robot 100 of FIG. 1 are respectively achieved by the actuators corresponding to the joints. That is, a neck joint yaw axis actuator A2, a neck joint pitch axis actuator A3, and a neck joint roll axis actuator A4 to respectively drive the neck joint yaw axis 2, the neck joint pitch axis 3, and the neck joint roll axis 4 are disposed in the head unit 30.

Further, a torso pitch axis actuator A5, a torso roll axis actuator A6, and a torso yaw axis actuator A7 to respectively drive the torso pitch axis 5, the torso roll axis 6, and the torso yaw axis 7 are disposed in the torso unit 40.

The arm units 50R/L respectively subdivide into upper arm units 51R/L, elbow joint units 52R/L, and lower arm units 53R/L. A shoulder joint pitch axis actuator A8, a shoulder joint roll axis actuator A9, an upper arm yaw axis actuator A10, an elbow joint pitch axis actuator A11, a lower arm yaw axis actuator A12, a wrist joint pitch axis actuator A13, and a wrist joint roll axis actuator A14 to respectively drive the shoulder joint pitch axis 8, the shoulder joint roll axis 9, the upper arm yaw axis 10, the elbow joint pitch axis 11, the lower arm yaw axis 12, the wrist joint pitch axis 13, and the wrist joint roll axis 14 are disposed in each of the arm units 50R/L.

Further, the leg units 60R/L respectively subdivide into thigh units 61R/L, knee joint units 62R/L, and calf units 63R/L. A leg joint yaw axis actuator A16, a leg joint pitch axis actuator A17, a leg joint roll axis actuator A18, a knee joint pitch axis actuator A19, an ankle joint pitch axis actuator A20, and an ankle joint roll axis actuator A21 to respectively drive the leg joint yaw axis 16, the leg joint pitch axis 17, the leg joint roll axis 18, the knee joint pitch axis 19, and the ankle joint pitch axis 20 are disposed in each of the leg units 60R/L.

Sub controller 35, 45, 55R/L, and 65R/L to control the drivings of the actuators are respectively disposed in the head unit 30, the torso unit 40, the arm units 50R/L, and the leg units 60R/L.

The main controller 80 transmits commands (i.e., instruction data to the actuators), which instruct the sub controllers 35, 45, 55R/L, and 65R/L to operate so as to perform adaptable controls and generate designated motion patterns, to the respective sub controllers 35, 45, 55R/L, and 65R/L, and the sub controllers 35, 45, 55R/L, and 65R/L respectively analyze the received commands and output signals to control the drivings of the respective actuators A2, A3, ..., A21.

Figure 3A:
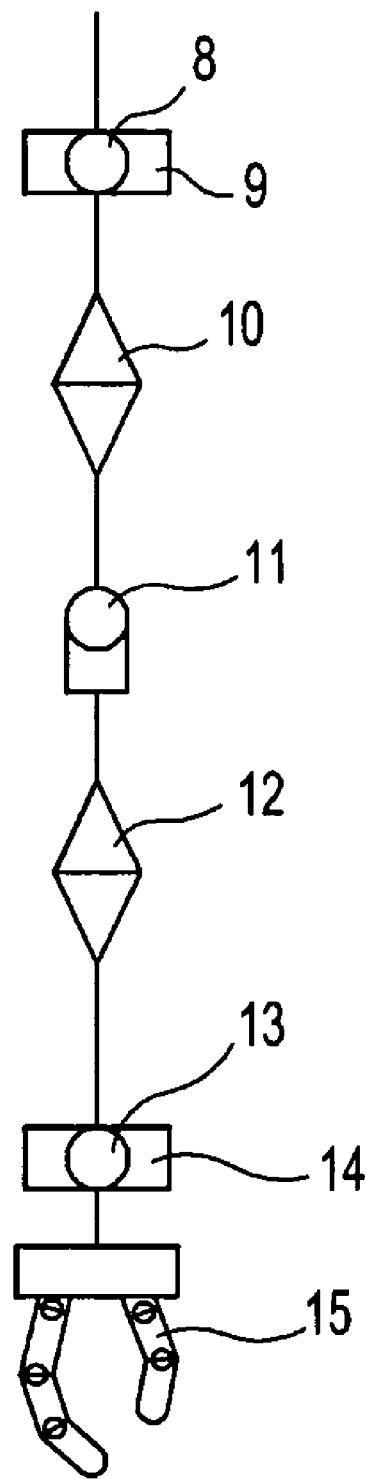
FIGS. 3A to 3C are views illustrating a series of motions of the robot in accordance with an exemplary embodiment, when external force is applied to the robot.
Figure 3B:
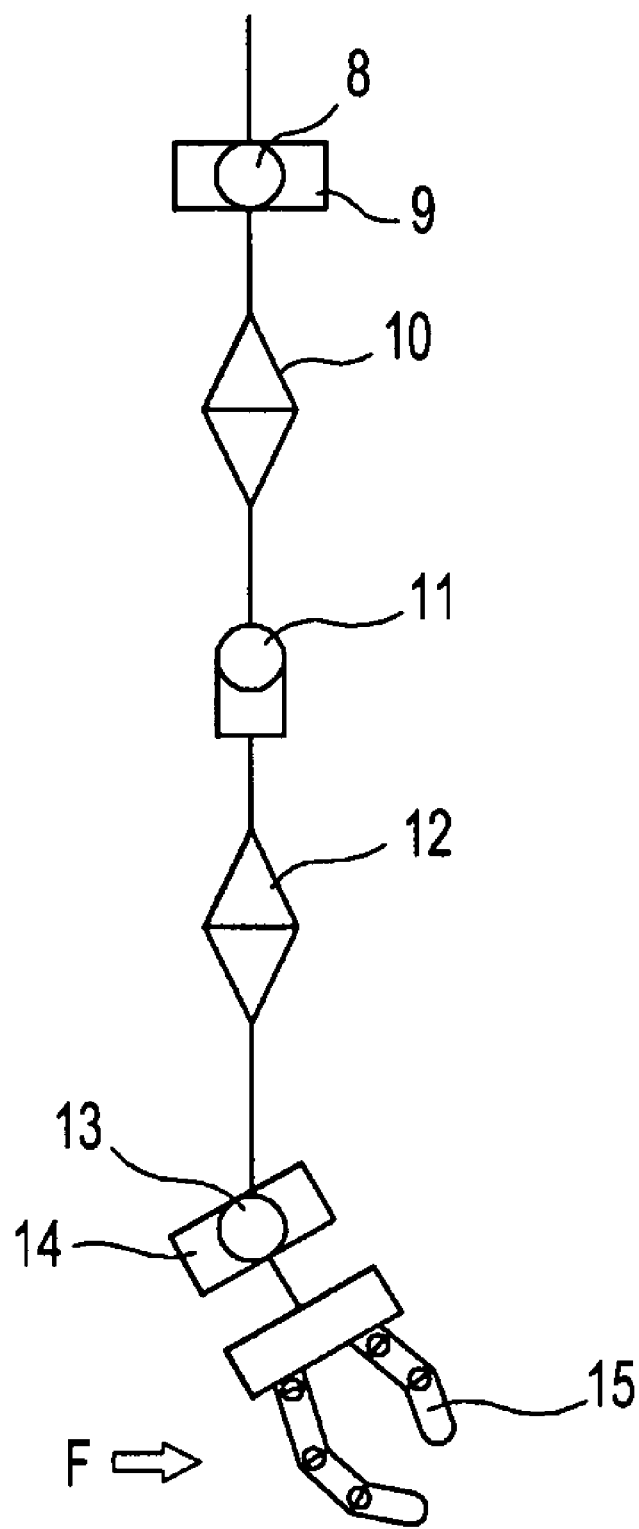
Figure 3C:
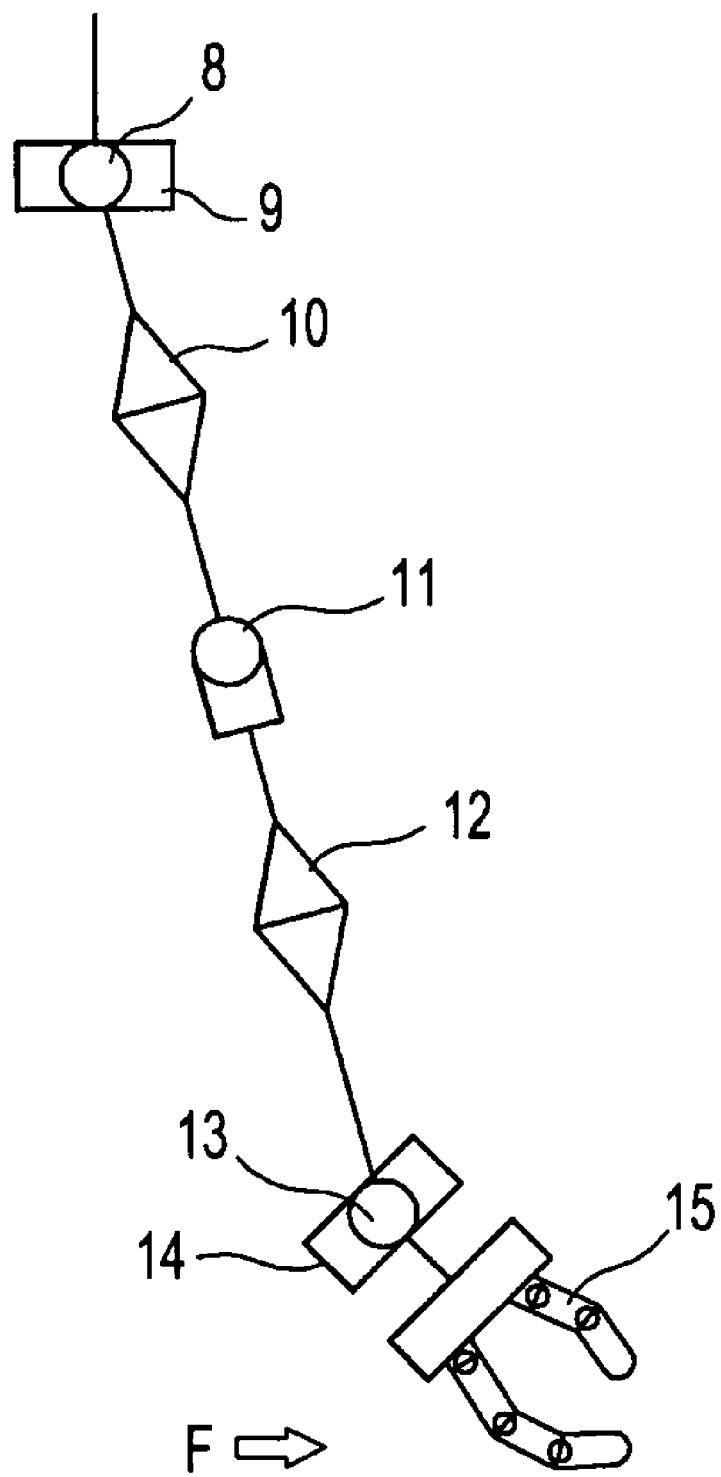

FIGS. 3A to 3C are views illustrating a series of motions of the robot in accordance with an exemplary embodiment, when external force is applied to the robot.

FIG. 3A illustrates the humanoid robot (hereinafter, referred to as a 'robot') 100, in a state in which no force is applied to the hand 15, FIG. 3B illustrates the robot 100, in a state in which the hand 15 is bent up to a designated angle when external force (F) is applied to the hand 15, and FIG. 3C illustrates the robot 100, in a state in which the degree of freedom of the shoulder joint pitch axis 8 is additionally secured and a link attached to the shoulder joint in the direction of the external force is rotated to compensate for the bending angle of the hand 15 and thus safely drive the robot 100.

That is, when the hand 15 is bent up to an allowable safety angle due to excessive external force (F), the robot 100 senses the bending of the hand 15, and causes the hand 15 to move in the direction of reducing the bending angle of a wrist joint using the degree of freedom of the higher-level joint. Although the above statements describes that when a lower-level joint is bent up to an allowable safety angle, a higher-level joint is rotated in the direction of reducing the bending angle of the lower-level joint, when a torque applied to the lower-level joint is measured and it is determined that the measured torque reaches an allowable safety torque, the degree of freedom of the higher-level joint may be secured and thus the higher-level joint may be rotated in the direction of reducing the torque. Here, the allowable safety angle may be a critical angle, at which a joint cannot be bent any more, or a random angle, which is predetermined by a user, and the allowable safety torque may be a torque, at which the joint cannot be normally operated, or a random angle, which is predetermined by the user.

The main controller 81 reduces all gains regarding the rotations of the higher-level joint on the roll, pitch, and yaw axes according to the bending direction of the lower-level joint, or sets all the gains to zero, and thus is capable of obtaining an additional degree of freedom, i.e., 3 redundant degrees of freedom. Further, in order to rotate the higher-level joint in the direction of reducing the bending angle of the lower-level joint due to external force, the main controller 81 may reduce only one gain out of all gains of the higher-level joint regarding rotations on the roll, pitch, and yaw axes, or set only one gain out of all the gains to zero.

The higher-level joint and the lower-level joint are not connected mechanically, but are operated by respective control functions. The method of safely controlling the robot 100 by securing a redundant degree of freedom when external force is applied to the robot 100 will be described in detail with reference to FIG. 4.

Figure 4:
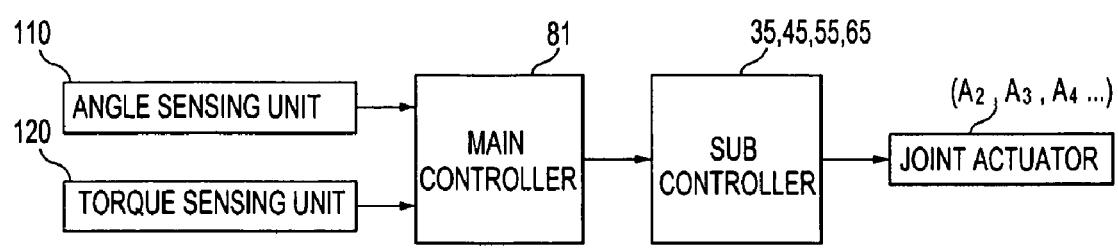
FIG. 4 is a control block diagram of the robot in accordance with an exemplary embodiment.

FIG. 4 is a control block diagram of the robot 100 in accordance with an exemplary embodiment.

As shown in FIG. 4, the robot 100 in accordance with an exemplary embodiment includes an angle sensing unit 110 to sense the bending angle of a joint, a torque sensing unit 120 to measure a torque applied to the robot 100, the main controller 81 to control the overall operation of the robot 100, the sub controllers 35, 45, 55, and 65 to control the corresponding parts of the robot 100 according to the commands of the main controller 81, and the joint actuators A2, A3 ... A21 to drive the respective joints according to the controls of the sub controllers 35, 45, 55, and 65.

The angle sensing unit 110 may be a rotation angle and position sensor. The rotation angle and position sensor is attached to a region, the angle of which is desired to sense, and is separately provided with an encoder, to which the rotation angle and position of a joint detected by the rotation angle and position sensor is inputted, and thus achieves the feedback of the detected rotation angle of the joint as well as the rotation angle of a servo-motor and uses the detected rotation angle of the joint to control the rotation angle of the joint of the robot 100.

The torque sensing unit 120 may be a torque sensor or a current sensor. The torque sensor is installed at one side of a motor, and senses the size of torque by measuring the rotary force of the motor. The current sensor calculates the size of torque applied to a motor by measuring current flowing in the motor. The torque sensor and the current sensor are generally used as a unit to calculate the torque of the motor.

The main controller 81 dynamically corrects a target to be controlled in response to the outputs of the respective sensing units 110 and 120. More concretely, the main controller 81 performs adaptive controls to the sub controllers 35, 45, 55 and 65.

When the main controller 81 receives data that a joint is excessively bent, from the angle sensing unit 110, or data that an excessively large torque is applied to a joint, from the torque sensing unit 120, the main controller 81 secures a redundant degree of freedom of a higher-level joint to remove the excessively large torque applied to the bending joint or correct the position of the bending joint. That is, the main controller 81 reduces gains corresponding to roll, pitch, and yaw values representing the rotations of the x, y, and z axes in Cartesian coordinates (x, y, z, roll, pitch, yaw) representing the position of the higher-level joint, or sets the gains to zero, and thus releases the restriction on the rotation of the higher-level joint, thereby additionally securing 3 degrees of freedom.

Therefore, when the lower-level joint is bent up to the allowable safety angle, the position of the lower-level joint is fixed so as to prevent the lower-level joint from being bent more and a redundant degree of freedom is added by the above-described method, and thus the higher-level joint is rotated in the direction of external force, i.e., in the direction of reducing the bending angle of the lower-level joint and prevents the excessive bending of the lower-level joint. Alternately, when an excessively large force is applied to the joint, a redundant degree of freedom of the higher-level joint is secured, and thus the higher-level joint is rotated in the direction of reducing the torque.

The sub controllers 35, 45, 55, and 65 receive commands (i.e., instruction data to the actuators), which instruct the sub controllers 35, 45, 55, and 65 to execute an operation to perform a designated motion pattern, from the main controller 81, analyze the received commands, and output driving control signals to the respective joint actuators A2, A3, ..., A21.

The joint actuators A2, A3, ..., A21 include yaw axis actuators, pitch axis actuators, and roll axis actuators, and rotate the corresponding joints on the yaw, pitch, and roll axes according to the driving control signals of the sub controllers 35, 45, 55, and 65.

Hereinafter, the main controller 81 and the sub controllers 35, 45, 55, and 65 are referred to as controllers 81, 35, 45, 55, and 65.

Figure 5A:
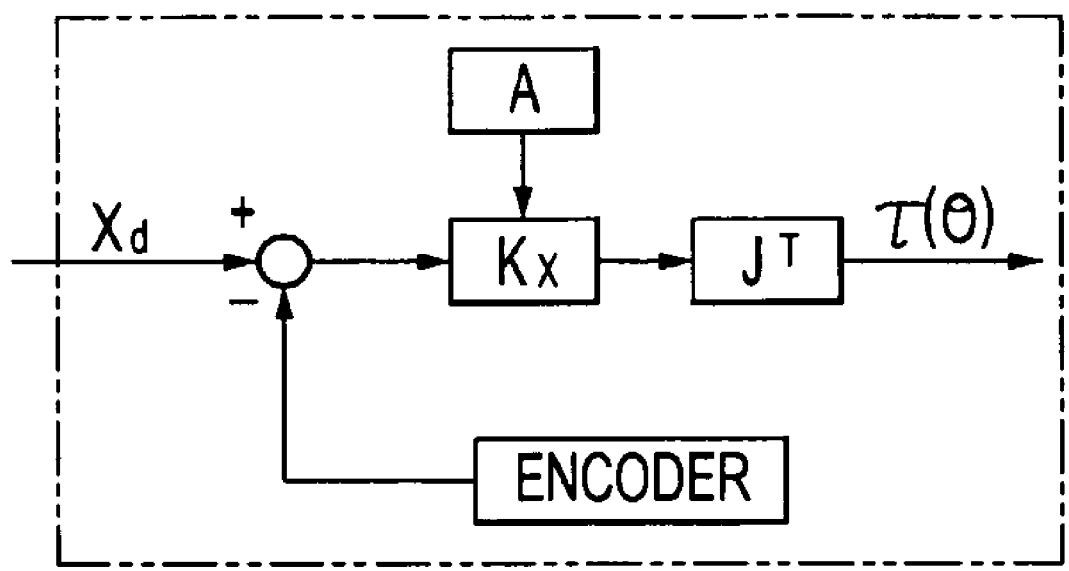
FIGS. 5A and 5B are views illustrating a procedure of performing an impedance control of a higher-level joint of the robot in accordance with an exemplary embodiment.
Figure 5B:
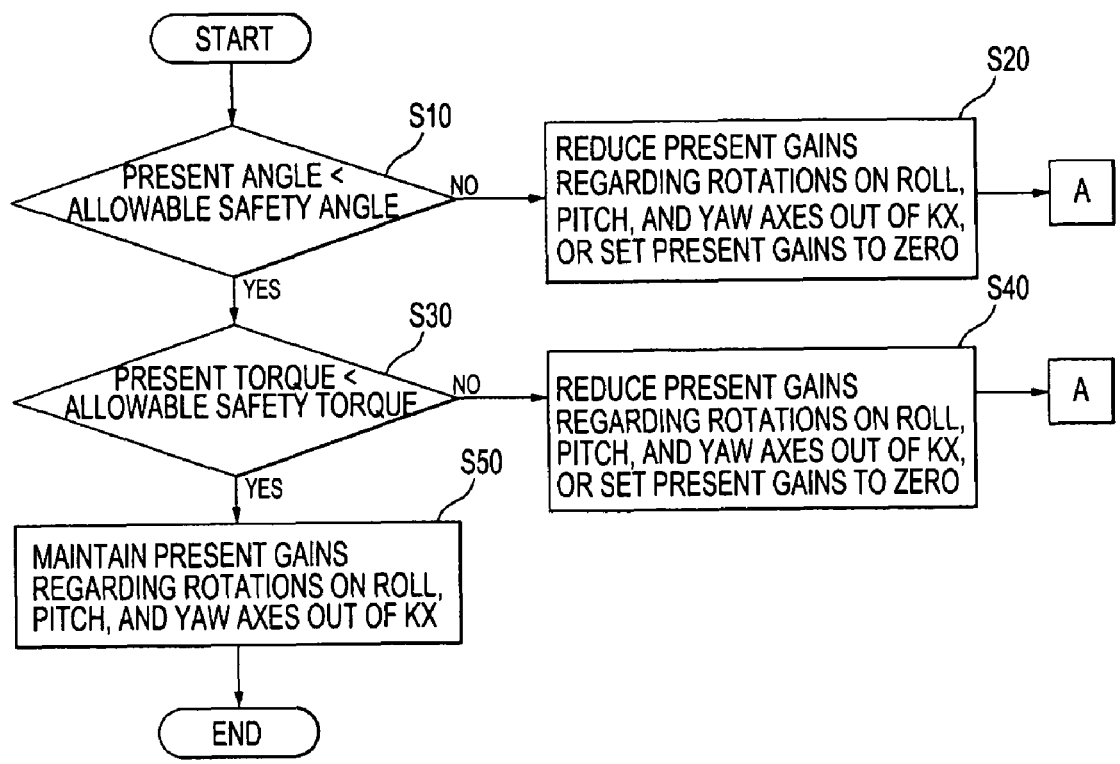

FIGS. 5A and 5B are views illustrating a procedure of performing an impedance control of a higher-level joint of the robot 100 in accordance with an exemplary embodiment.

FIG. 5A illustrates the impedance control flow of the higher-level joint by the expression below.

$$\tau(\theta) = J^T \cdot K_X \cdot (X_d - X)$$

In the expression above, τ(θ) represents a torque, which a motor connected to a joint should be output, $J^T$ represents a transposed matrix of a Jacobian matrix, $K_X$ represents an impedance stiffness gain, $X_d$ represents a position in Cartesian coordinates, to which a link of a higher-level joint to be controlled is desired to move, and X represents a position of the link of the higher-level joint to be controlled.

That is, the expression above represents the procedure of FIG. 5A, and is used to calculate a torque, which a motor driving the higher-level joint of a joint, to which external force is applied, should be outputted.

The impedance control is a control, causing the robot 100 to be operated with a variable stiffness, and a torque value (τ(θ)) of the joint is calculated by multiplying the transposed matrix ($J^T$) of the Jacobian matrix of a link to be controlled (the link of the higher-level joint to be controlled in an exemplary embodiment) by the impedance stiffness gain ($K_X$) and a position difference ($X_d$-X). Thus, the larger the position difference of the link to be controlled is, the larger the torque to reduce the position difference is, and the larger the impedance stiffness gain is set, the higher the stiffness is achieved, and thus a large torque is generated even with a small position difference.

Based on the expression above, in an exemplary embodiment, in case that the bending angle of the lower-level joint due to external force applied to the lower-lever joint reaches the allowable safety angle or a torque applied to the lower-level joint reaches the allowable safety torque, gains regarding rotations on roll, pitch, and yaw axes out of the impedance stiffness gains ($K_X$) of the higher-level joint are reduced or set to zero, and thus the redundant degree of freedom of the higher-level joint is secured and the higher-level joint is rotated in the direction of reducing the bending angle of the lower-level joint or the torque applied to the lower-level joint.

'A' represents a portion containing data to reduce the gains regarding rotations on roll, pitch, and yaw axes out of the impedance stiffness gains ($K_X$) of the higher-level joint or set the gains to zero. That is, the portion 'A' contains data to correct values of the gains ($K_X$), and the data are obtained by the control flow of FIG. 5B.

As shown in FIG. 5B, the controllers 81, 35, 45, 55, and 65 compare the bending angle of the joint due to external force with the allowable safety angle predetermined by a designer, and, when it is confirmed that the present bending angle of the joint is more than the allowable safety angle, reduce gains regarding rotations on roll, pitch, and yaw axes out of the impedance stiffness gains ($K_X$) of the higher-level joint and thus secure the redundant degree of freedom of the higher-level joint. In order to secure the redundant degree of freedom of the higher-level joint, it is possible to reduce all the gains regarding rotations on roll, pitch, and yaw axes out of the impedance stiffness gains ($K_X$) of the higher-level joint or set all the gains regarding rotations on roll, pitch, and yaw axes to zero to additionally secure 3 redundant degrees of freedom, or it is possible to reduce only a gain in the direction of reducing the bending angle of the lower-level joint due to the external force, i.e., only one gain out of all gains regarding rotations on roll, pitch, and yaw axes or set only one gain out of all gains regarding rotations on roll, pitch, and yaw axes to zero to additionally secure 1 redundant degree of freedom (operation S10 and operation S20).

Thereafter, the controllers 81, 35, 45, 55, and 65 compare a present torque applied to the lower-level joint with the allowable safety torque, and when it is confirmed that the present torque is more than the allowable safety torque, reduce gains regarding rotations on roll, pitch, and yaw axes out of the impedance stiffness gains ($K_X$) of the higher-level joint and thus secure the redundant degree of freedom of the higher-level joint. In order to secure the redundant degree of freedom of the higher-level joint, it is possible to reduce all the gains regarding rotations on roll, pitch, and yaw axes out of the impedance stiffness gains ($K_X$) of the higher-level joint or set all the gains regarding rotations on roll, pitch, and yaw axes to zero to additionally secure 3 redundant degrees of freedom, or it is possible to reduce only a gain in the direction of reducing the torque applied to the lower-level joint, i.e., only one gain out of all gains regarding rotations on roll, pitch, and yaw axes or set only one gain out of all gains regarding rotations roll, pitch, and yaw axes to zero to additionally secure 1 redundant degree of freedom (operation S30 and operation S40).

When it is confirmed that the bending angle of the lower-level joint is not more than the allowable safety angle and the torque applied to the lower-level joint is not more than the allowable safety torque, the controllers 81, 35, 45, 55, and 65 maintain the impedance stiffness gains ($K_X$) of the higher-level joint (operation S50).

Figure 6:
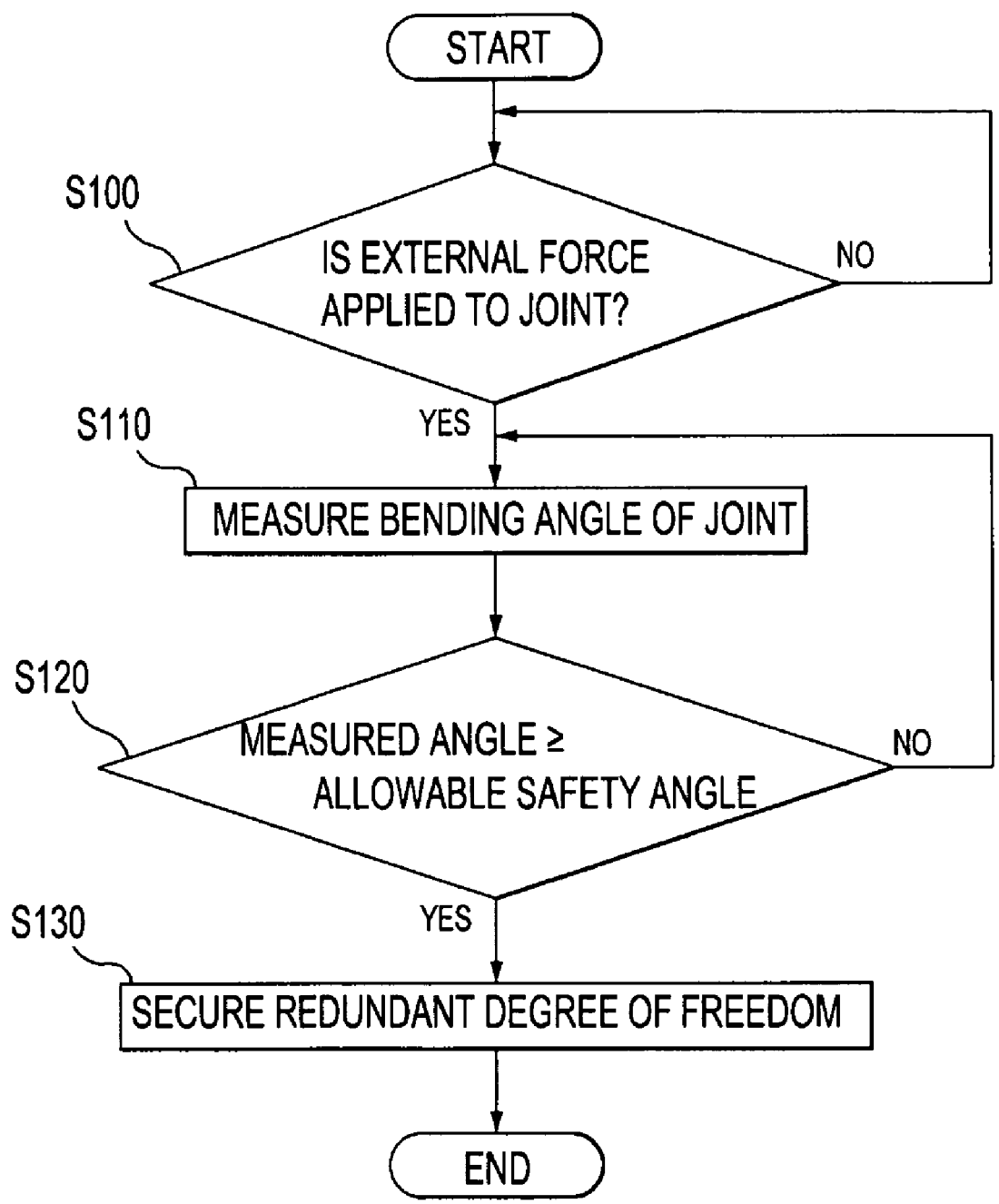
FIG. 6 is a flow chart illustrating a method of controlling a higher-level joint of a humanoid robot in accordance with an exemplary embodiment against external force.

FIG. 6 is a flow chart illustrating a method of controlling a higher-level joint of the robot 100 in accordance with an exemplary embodiment against external force.

As shown in FIG. 6, the controllers 81, 35, 45, 55, and 65 confirm whether or not external force is applied to a joint (or a link), and when it is confirmed that the external force is applied to the joint, measure the bending angle of the joint due to the external force (operation S100 and operation S110).

Thereafter, the controllers 81, 35, 45, 55, and 65 compare the measured bending angle with the allowable safety angle, and, when it is confirmed that the measured bending angle is more than the allowable safety angle, reduce gains regarding rotations on roll, pitch, and yaw axes out of the impedance stiffness gains ($K_X$) of a higher-level joint located above the joint, to which the external force is applied, or set the gains regarding rotations on roll, pitch, and yaw axes to zero to secure the redundant degree of freedom of the higher-level joint, thus rotating the higher-level joint in the direction to reduce the bending angle of the lower-level joint (operation S120 and operation S130).

When it is confirmed that the bending angle of the lower-level joint due to the external force is not more than the allowable safety angle, the controllers 81, 35, 45, 55, and 65 maintain the impedance stiffness gains ($K_X$) of the higher-level joint, and confirms again whether or not the bending angle of a joint, to which external force is applied, is increased more than the allowable safety angle.

Figure 7:
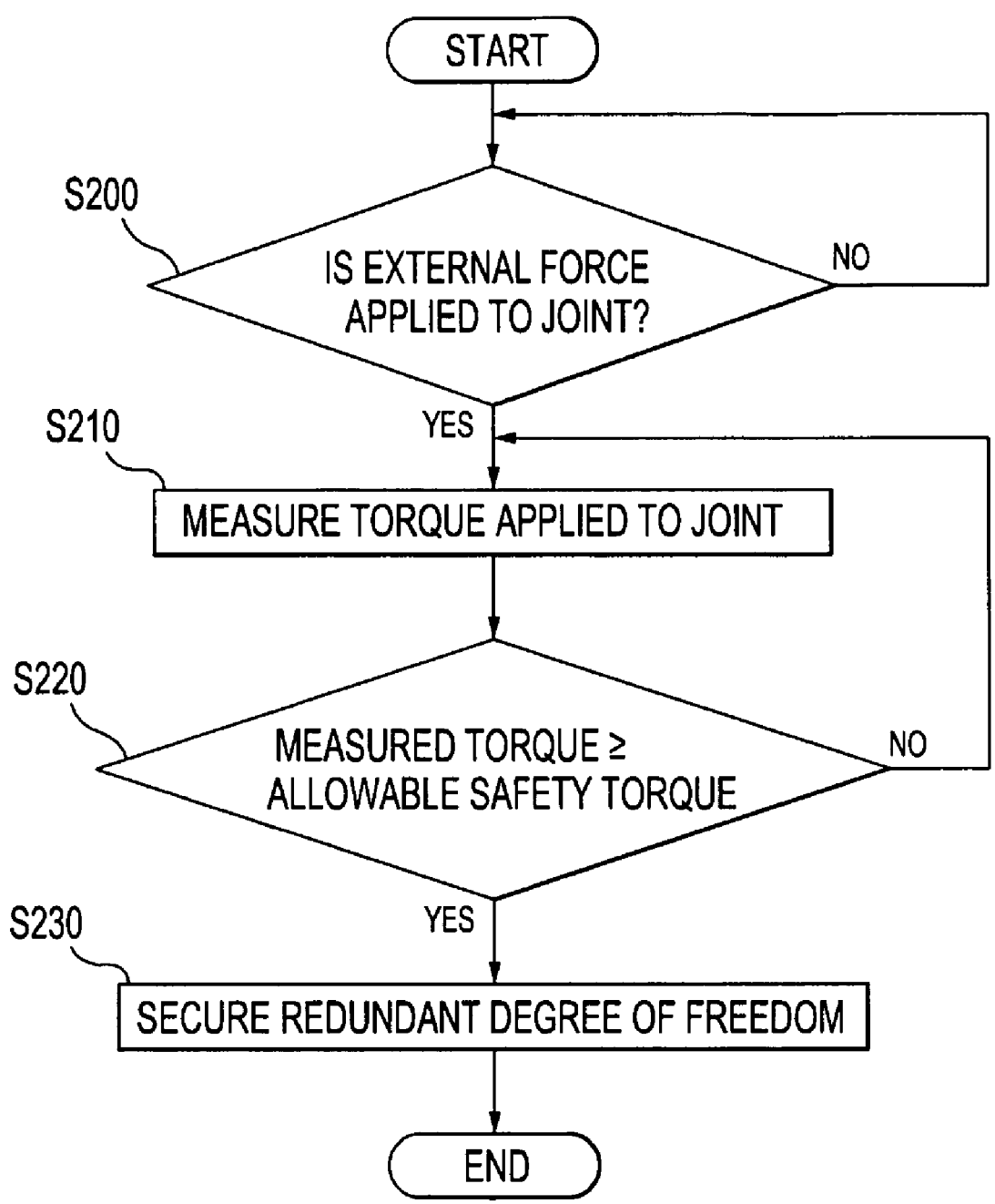
FIG. 7 is a flow chart illustrating a method of controlling a higher-level joint of a humanoid robot in accordance with an exemplary embodiment against external force.

FIG. 7 is a flow chart illustrating a method of controlling the higher-level joint of the robot 100 in accordance with an exemplary embodiment against external force.

As shown in FIG. 7, the controllers 81, 35, 45, 55, and 65 confirm whether or not external force is applied to a joint (or a link), and when it is confirmed that the external force is applied to the joint, measure a torque applied to the joint due to the external force (operation S200 and operation S210).

Thereafter, the controllers 81, 35, 45, 55, and 65 compare the measured torque with the allowable safety torque, and, when it is confirmed that the measured torque is more than the allowable safety torque, reduce gains regarding rotations on roll, pitch, and yaw exes out of the impedance stiffness gains ($K_X$) of a higher-level joint located above the joint, to which the external force is applied, or set the gains regarding rotations on roll, pitch, and yaw axes to zero to secure the redundant degree of freedom of the higher-level joint, thus rotating the higher-level joint in the direction to reduce the torque applied to the lower-level joint (operation S220 and operation S230).

When it is confirmed that the torque applied to the lower-level joint due to the external force is not more than the allowable torque, the controllers 81, 35, 45, 55, and 65 maintain the impedance stiffness gains ($K_X$) of the higher-level joint, and confirms again whether or not the torque applied to a joint, to which external force is applied, is increased more than the allowable safety torque.

As apparent from the above description, although these exemplary embodiments illustrate the humanoid robot 100, exemplary embodiments may be applied to all robots, which perform an impedance control.

In accordance with an aspect of exemplary embodiments, when a joint of the robot is bent up to a critical angle due to excessive external force, the angle of a joint of the higher-level link is adjusted using a redundant degree of freedom of the robot, and thus the robot is safely controlled by compensating for the excessively bending angle of the joint.

Although a few exemplary embodiments have been shown and described, it would be appreciated by those skilled in the art that changes may be made in these exemplary embodiments without departing from the principles and spirit of the disclosure, the scope of which is defined in the claims and their equivalents.

What is claimed is:

1. A method of controlling a robot, comprising:
   sensing a bending angle of a joint due to external force;
   comparing the bending angle of the joint with an allowable safety angle; and
   securing a redundant degree of freedom of a higher-level joint of the joint to rotate the higher-level joint in the direction of reducing the bending angle of the joint, when the bending angle of the joint is more than the allowable safety angle.

2. The method according to claim 1, wherein the redundant degree of freedom is secured by reducing impedance stiffness gains of the higher-level joint.

3. The method according to claim 1, wherein the redundant degree of freedom is secured by reducing at least one gain out of gains of the higher-level joint regarding rotations on roll, pitch, and yaw axes.

4. The method according to claim 1, wherein the redundant degree of freedom is secured by setting at least one gain out of gains of the higher-level joint regarding rotations on roll, pitch, and yaw axes to zero.

5. The method according to claim 1, wherein the allowable safety angle is an angle, at which the joint cannot move any more, or a predetermined angle.

6. A method of controlling a robot, comprising:
   sensing a torque applied to a joint;
   comparing the torque with an allowable safety torque; and
   securing a redundant degree of freedom of a higher-level joint of the joint to rotate the higher-level joint in the direction of reducing the torque applied to the joint, when the torque is more than the allowable safety torque.

7. The method according to claim 6, wherein the redundant degree of freedom is secured by reducing impedance stiffness gains of the higher-level joint.

8. The method according to claim 6, wherein the redundant degree of freedom is secured by reducing at least one gain out of gains of the higher-level joint regarding rotations on roll, pitch, and yaw axes.

9. The method according to claim 6, wherein the redundant degree of freedom is secured by setting at least one gain out of gains of the higher-level joint regarding rotations on roll, pitch, and yaw axes to zero.

10. The method according to claim 6, wherein the allowable safety torque is a torque, at which the joint cannot be normally operated, or a predetermined torque.

11. A robot comprising:
    an angle sensing unit to sense a bending angle of a joint of the robot due to external force; and
    a control unit to confirm whether or not the bending angle of the joint reaches an allowable safety angle, and secure a redundant degree of freedom of a higher-level joint of the joint to rotate the higher-level joint in the direction of reducing the bending angle of the joint, when the bending angle of the joint reaches the allowable safety angle.

12. The robot according to claim 11, wherein the control unit secures the redundant degree of freedom by reducing impedance stiffness gains of the higher-level joint.

13. The robot according to claim 11, wherein the control unit secures the redundant degree of freedom by reducing at least one gain out of gains of the higher-level joint regarding rotations on roll, pitch, and yaw axes.

14. The robot according to claim 11, wherein the control unit secures the redundant degree of freedom by setting at least one gain out of gains of the higher-level joint regarding rotations on roll, pitch, and yaw axes to zero.

15. A robot comprising:
    a torque sensing unit to sense a torque applied to a joint of the robot; and
    a control unit to confirm whether or not the torque applied to the joint reaches an allowable safety torque, and secure a redundant degree of freedom of a higher-level joint of the joint to rotate the higher-level joint in the direction of reducing the torque applied to the joint, when the torque applied to the joint reaches the allowable safety torque.

16. The robot according to claim 15, wherein the control unit secures the redundant degree of freedom by reducing impedance stiffness gains of the higher-level joint.

17. The robot according to claim 15, wherein the control unit secures the redundant degree of freedom by reducing at least one gain out of gains of the higher-level joint regarding rotations on roll, pitch, and yaw axes.

18. The robot according to claim 15, wherein the control unit secures the redundant degree of freedom by setting at least one gain out of gains of the higher-level joint regarding rotations on roll, pitch, and yaw axes to zero.

* * * * *

UNITED STATES PATENT AND TRADEMARK OFFICE
CERTIFICATE OF CORRECTION

| | | |
|---|---|---|
| PATENT NO. | : 8,271,137 B2 | Page 1 of 1 |
| APPLICATION NO. | : 12/585188 | |
| DATED | : September 18, 2012 | |
| INVENTOR(S) | : Kyung Won Moon et al. | |

It is certified that error appears in the above-identified patent and that said Letters Patent is hereby corrected as shown below:

On the Title Page Col. 1 (Inventors), Line 2, Delete "Seognam-si (KR);" and insert
-- Seongnam-si (KR); --, therefor.

In the Claims

In Col. 10, Line 23 (Approx.), In Claim 11, after "and" insert -- to --.

Signed and Sealed this
Twenty-ninth Day of October, 2013

Teresa Stanek Rea
*Deputy Director of the United States Patent and Trademark Office*